United States Patent [19]

Dickinson

[11] Patent Number: 5,542,471
[45] Date of Patent: Aug. 6, 1996

[54] HEAT TRANSFER ELEMENT HAVING THE THERMALLY CONDUCTIVE FIBERS

[75] Inventor: Richard C. Dickinson, Arlington Heights, Ill.

[73] Assignee: Loral Vought System Corporation, Dallas, Tex.

[21] Appl. No.: 152,536

[22] Filed: Nov. 16, 1993

[51] Int. Cl.⁶ ........................................ F28F 7/00
[52] U.S. Cl. .................... 165/170; 165/164; 165/180; 165/185
[58] Field of Search ................... 165/164, 180, 165/185, 905, 170

[56] References Cited

U.S. PATENT DOCUMENTS

| | | | |
|---|---|---|---|
| 4,432,408 | 2/1984 | Caines | 165/1 |
| 4,852,645 | 8/1989 | Coulon et al. | 165/180 |
| 4,867,235 | 9/1989 | Grapes et al. | 165/185 |
| 5,255,738 | 10/1993 | Przilas | 165/185 |
| 5,390,734 | 2/1995 | Voorhes et al. | 165/185 |

OTHER PUBLICATIONS

T. F. Fleming and D. M. Palmer, "Amoco Perfomance Product's High Thermal Conductive Fibers," Presented at Dallas, Texas, Apr. 9, 1992, pp. 1–20.

*Primary Examiner*—Allen J. Flanigan
*Attorney, Agent, or Firm*—Arnold, White & Durkee

[57] ABSTRACT

A heat transfer element having longitudinally thermally conductive fibers is disclosed. The fibers extend between two substances that heat is to be transferred between in order to maximize the heat transfer. For instance, a plate having fibers extending generally perpendicular to the plate is disclosed. The plate is formed and/or arranged to remove heat from a fluid. The heat transfer element may take many forms, including the form of a rigid member having complex contours or a flexible member that may be routed in a cord-like fashion.

26 Claims, 4 Drawing Sheets

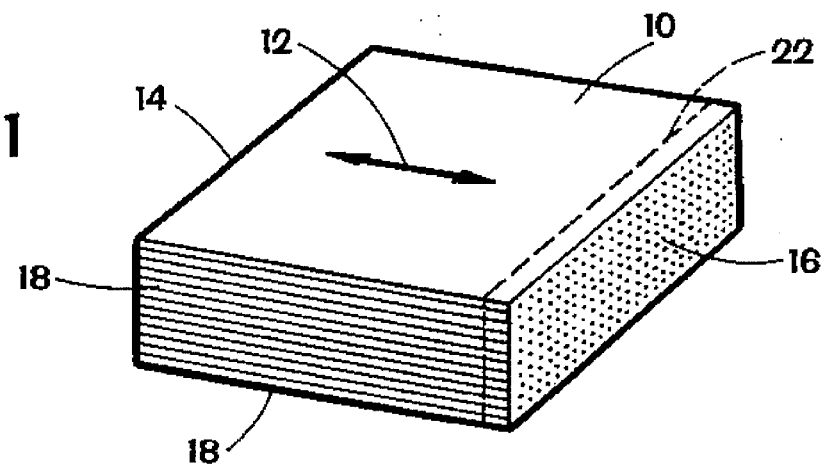
FIG. 1
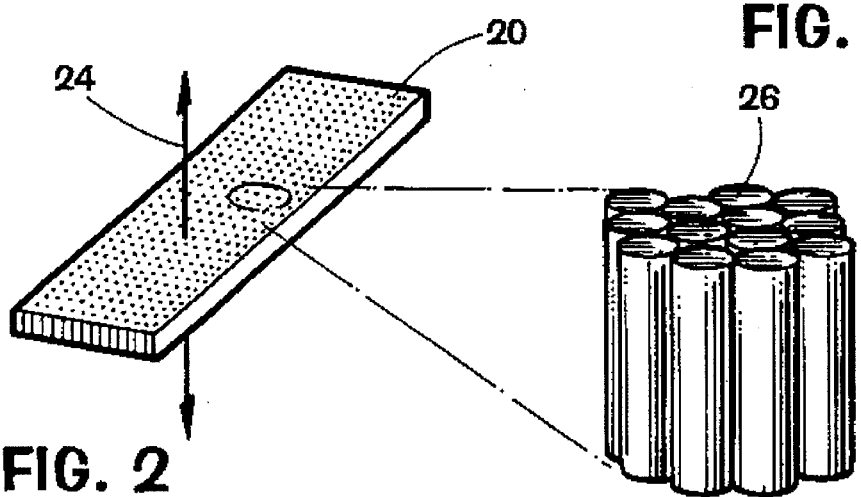
FIG. 2
FIG. 2A
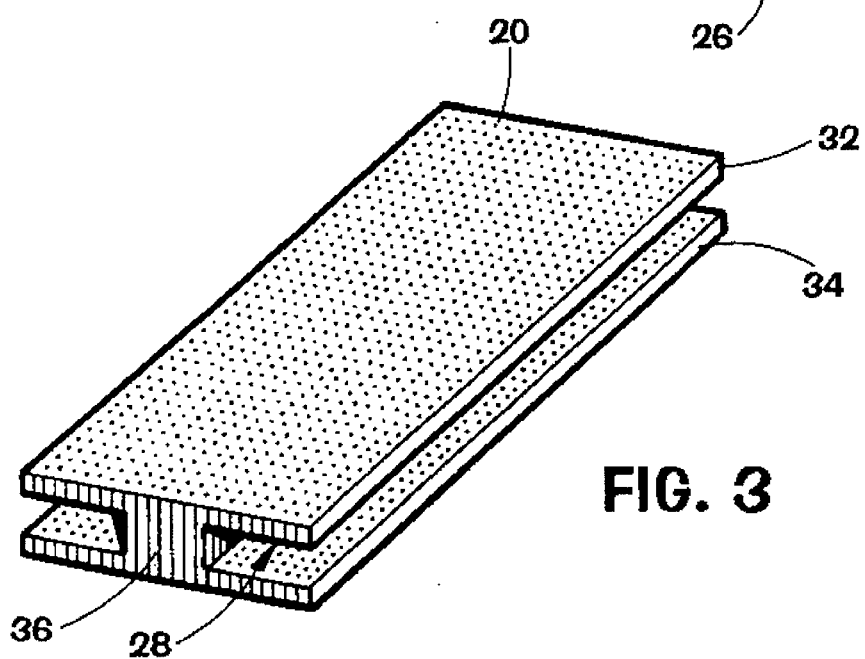
FIG. 3

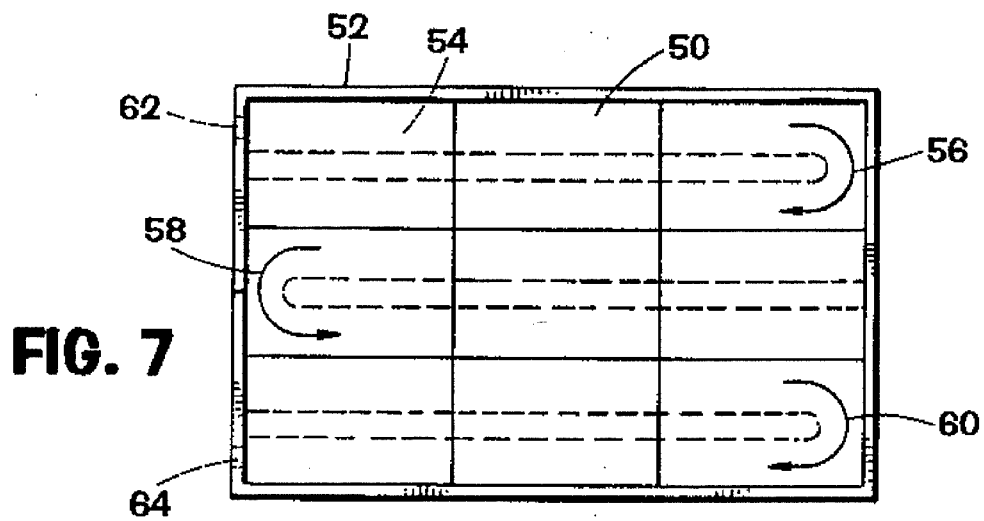
FIG. 7
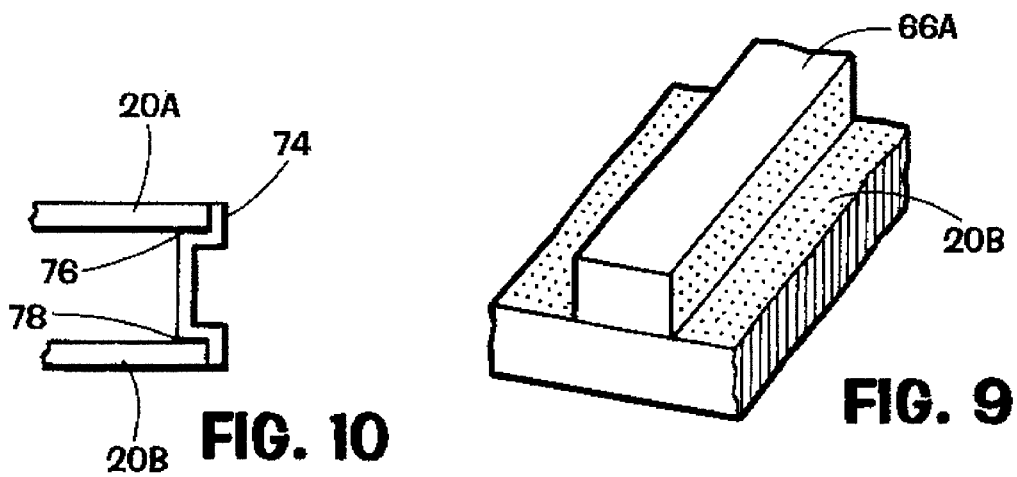
FIG. 10
FIG. 9
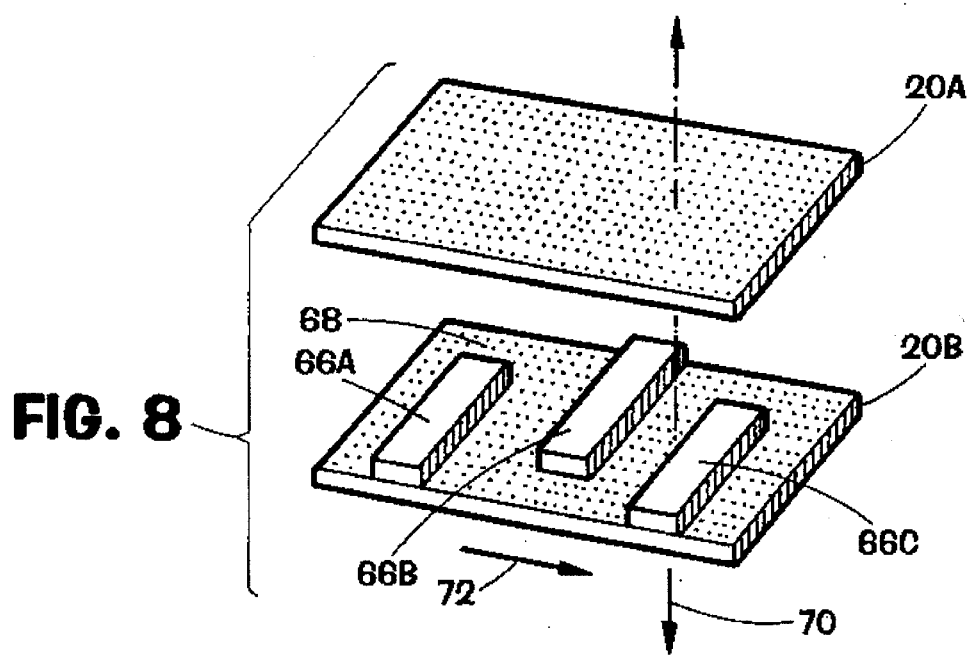
FIG. 8

HEAT TRANSFER ELEMENT HAVING THE THERMALLY CONDUCTIVE FIBERS

BACKGROUND OF THE INVENTION

1. Field of the Invention

The present invention relates generally to heat transfer elements and, more particularly, to heat transfer elements having thermally conductive fibers.

2. Description of the Related Art

It is well known that when two substances having different temperatures are brought together, the temperature of the warmer substance decreases and the temperature of the cooler substance increases. For example, when one takes a package of frozen meat from the freezer and places it on a counter to defrost, the temperature of the meat increases while the temperature of the counter and of the surrounding air decreases. Essentially, energy from the air and from the counter are being transferred to the meat to warm it. The temperature of the meat will continue to increase until its temperature equals that of the air and of the counter. At this time, the energy transfer ceases.

This energy or heat transfer can generally be broken into three basic categories: conduction, convection, and radiation. The transfer of energy by conduction occurs as a result of the presence of a temperature gradient within a fluid or solid. The transfer of energy by convection occurs between a fluid and a solid surface as a result of the temperature difference between the fluid and the solid surface. For instance, if the fluid is flowing through a passageway in the solid material that is cooler than the fluid, energy will be transferred from the fluid to the solid material, and the temperature of the fluid decreases. Lastly, the transfer of energy by electromagnetic waves is referred to as radiation heat transfer. Radiation heat transfer typically refers to energy transferred by thermal radiation between a solid surface and a gas or between two or more surfaces.

We take advantage of these thermodynamic properties every day, although we do not think much about it or are completely unaware of it. For instance, many devices that we rely on every day generate heat as a result of their operation. This heat generated by a device must be dissipated in order to maintain the device within a given operating temperature range so that it continues to function properly. One of the most common examples that demonstrates the three general categories of heat transfer is the automobile. The engine forms the heart of an automobile. As the engine operates, it generates heat that would quickly destroy the engine if the heat were not removed to maintain the engine temperature within a given range. The most common way to remove heat from an engine is to provide fluid passageways within the engine and to connect these fluid passageways to an external radiator, typically made from a metal such as aluminum, copper, or steel. As fluid circulates between the engine and the radiator, the radiator removes heat from the fluid and sends the cooler fluid back to cool the engine. The radiator transfers its heat energy to the air that passes over and surrounds the radiator.

Of course, it is understood that the radiator of an automobile is only one of many heat transfer elements currently in use. For instance, electrical parts, such as integrated circuits formed on semiconductor chips, also produce heat during operation. In most applications, metal heat sinks having fins are attached to these chips to remove heat from the chips. A fan is typically positioned to blow air over the fins so that energy from the heat sinks radiates into the large volume of air passing over the fins. However, in some more demanding applications, the electrical components may be coupled to a substrate, such as a ceramic substrate, that has a plurality of fluid passageways running throughout it. Much like the automobile's engine mentioned earlier, these fluid passageways are coupled to a heat transfer element, commonly called a radiator. The heated fluid passes into the radiator where it is cooled aid returned to the ceramic substrate to absorb heat from the electrical components.

Typically, electrical systems that require fluidic cooling are systems in which the electrical components are densely packed in an effort to reduce the size and weight of the electrical system. For instance, designers of electrical systems for satellites are primarily concerned with the size and weight of these systems. Of course, as automobiles are made smaller and lighter in order to preserve precious fuel and to comply with federal regulations, the size and weight of automobile radiators is also a concern. However, unlike the automobile industry, the satellite industry contains far fewer competitors. Thus, while high costs may prohibit the use of the smallest, lightest, and most efficient radiators in automobiles, the cost of a satellite's components is not so great a concern.

The present invention is directed to overcoming, or at least reducing the effects of, one or more of the problems set forth above by providing a novel and nonobvious heat transfer element.

SUMMARY OF THE INVENTION

In accordance with one aspect of the present invention, there is provided a heat transfer element including a plate that has a first side and a second side. The plate is comprised of fibers extending longitudinally from the first side to the second side. The fibers have a greater longitudinal thermal conductivity than radial thermal conductivity. The plate has a channel extending through the plate in a direction generally perpendicular to the fibers.

In accordance with another aspect of the present invention, there is provided a heat transfer element including a first plate that has a first side and a second side. The first plate is comprised of first fibers extending longitudinally from the first side of the first plate to the second side of the first plate. The first fibers have a greater longitudinal thermal conductivity than radial thermal conductivity. The element also includes a second plate that has a first side and a second side. The second plate is comprised of second fibers extending longitudinally from the first side of the second plate to the second side of the second plate. The second fibers have a greater longitudinal thermal conductivity than radial thermal conductivity. The element further includes a divider that couples the first side of the first plate to the second side of the second plate to form a channel extending between the first side of the first plate and the second side of the second plate in a direction generally perpendicular to the first fibers and the second fibers.

In accordance with still another aspect of the present invention, there is provided a method of fabricating a heat transfer element. The method includes the steps of:

forming a block of composite material having fibers extending longitudinally and generally parallel to one another along the length of the block;

removing a portion of the composite material from the block so that the fibers extend generally longitudinally from a first side of the portion to a second side of the portion; and forming a channel that extends along the portion in a direction generally perpendicular to the fibers.

BRIEF DESCRIPTION OF THE DRAWINGS

The foregoing and other advantages of the invention will become apparent upon reading the following detailed description and upon reference to the drawings in which:

FIG. 1 illustrates a perspective view of a block of composite material;

FIG. 2 illustrates a perspective view of a plate of composite material taken from the block of composite material illustrated in FIG. 1;

FIG. 2A illustrates a perspective view of an enlarged portion of the plate illustrated in FIG. 2;

FIG. 3 illustrates a perspective view of a plate of composite material having a peripheral slot formed therein;

FIG. 7 illustrates a top view of a radiator constructed using nine heat transfer elements arranged in a 3×3 matrix;

FIG. 8 illustrates a partially exploded perspective view of a heat transfer element having separate plates coupled together by separate dividers;

FIG. 9 illustrates an enlarged perspective view of a portion of one of the dividers illustrated in FIG. 8;

FIG. 10 illustrates a side view of a peripheral divider coupled to two plates;

Figure 4:
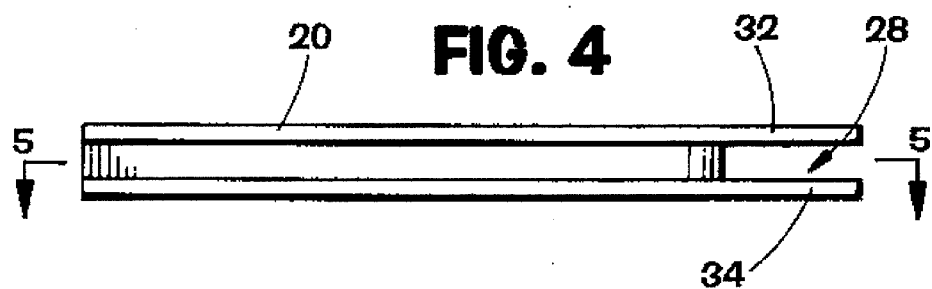
FIG. 4 illustrates a side view of the plate illustrated in FIG. 3.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

It has been discovered that some continuous fibers exhibit directional thermal conductivity. In other words, these continuous fibers conduct heat very well along the longitudinal direction of the fiber, but they radiate very little heat in the radial direction. One continuous fiber that exhibits particularly good longitudinal thermal conductivity is a pitch-based graphite fiber denoted as K1100X fabricated by Amoco Performance Products, Inc., 375 Noahridge Rd., Atlanta, Ga. 30350.

Table 1 below provides a comparison of the thermal properties of this fiber with other materials and with composites made from this fiber.

TABLE 1

| Material | Longitudinal Thermal Conductivity | Specific Conductivity |
| --- | --- | --- |
| Al 6063 | 218 | 81 |
| Copper | 400 | 45 |
| P-100 | 520 | 236 |
| P-120 | 640 | 305 |
| K1100X | 1100 | 500 |
| K1100X/Al (55 v/o) | 634 | 236 |
| K1100X/Epoxy (60 v/o) | 627 | 344 |
| K1100X/Cu (46 v/o) | 709 | 117 |
| K1100X/C (53 v/o) | 696 | 383 |

The longitudinal thermal conductive properties of these types of fibers are based on the microstructure of the fibers. For the K1100X fiber, even if two fibers within a fiber bundle are touching each other along the length of the bundle, radial heat transfer from one fiber to the other is only on the order of about 5% of the total heat within the fiber. About 95% of the heat passes longitudinally through the fiber to the end of the fiber.

Turning now to the drawings and referring initially to FIG. 1, a block of composite material 10 is formed using fibers that exhibit directional (longitudinal) thermal conductivity. Preferably, the K1100X graphite fibers are used to form the composite block 10 where the fiber bundles are oriented unidirectionally or in a highly biased orientation generally in the direction of the double-headed arrow 12 so that the ends of the fibers are exposed at opposite faces 14 and 16 of the block 10.

The composite block 10 may be an organic matrix composite (e.g., the fibers are imbedded in an organic matrix, such as an epoxy or a phenolic resin), a carbon/carbon composite (e.g., the organic composite is heated to burn the epoxy from the composite), a metal matrix composite (e.g., the fiber is imbedded in metal by melting the metal around the fiber), or a ceramic matrix (e.g., the fiber is imbedded in a ceramic material that surrounds the fiber). The preferred composition of the composite block 10 will vary depending upon the application in which the heat transfer element is to be used. However, for satellite applications where weight is a primary concern, a carbon/carbon composite may be preferable because it typically exhibits a weight advantage as compared to an organic composite or a metal composite.

Those skilled in the art will recognize that a carbon/carbon composite is typically formed by curing an organic matrix composite. After the organic matrix composite has been formed by impregnating the graphite fibers with an organic resin, the organic matrix composite is heated to approximately 1500° F. to char the organic matrix. The composite may be reimpregnated and recurred repeatedly to obtain the desired carbon/carbon composite. The resulting carbon/carbon composite exhibits a density of approximately 1.68 g/cc, while a typical organic matrix composite will exhibit a density of about 1.6 g/cc and a typical metal matrix composite will exhibit a density of about 5.9 g/cc.

Assuming that the composite block 10 is an organic matrix composite or a carbon/carbon composite, the composite block 10 is preferably formed by laminating several sheets 18 of fiber composite tape or cloth together. However, before describing the manner in which the composite block 10 is formed, it should be understood how each of the sheets 18 are formed. As will be appreciated by those skilled in the art, most graphite fibers have small diameters and are typically handled as bundles rather than as individual monofilaments. Commercially available bundles typically contain 1,000 to 12,000 fibers, and the bundles of K1100X graphite fibers typically contain approximately the same number of fibers.

To form the sheets 18, the fiber bundles are directionally aligned to form a tape. This tape is impregnated with a resin, such as epoxy, to form a sheet 18. Alternatively, to add extra strength to the sheet 18, it may be formed as a highly biased cloth that contains some reinforcing strands running perpendicular to, and woven through, the longitudinal fibers. A 1:10 ratio of reinforcing fibers to thermally conductive longitudinal fibers is typically sufficient.

The sheets 18 of substantially unidirectional fibers are laminated together to form the composite block 10. The sheets 18 forming the block 10 are typically bonded together by applying heat which cures the organic resin into a solid mass. The lay-up is preferably 0°. In other words, the angle between the fibers in one sheet 18 and the fibers in an adjacent sheet 18 is about 0°. The thickness of the composite block 10, i.e., the number of sheets 18 to be laminated together, is determined by the desired width of the heat transfer element. When the desired thickness of the composite block 10 is attained, the composite block 10 will contain a three-dimensional array of longitudinally thermally conductive fibers lying generally parallel to the double-headed arrow 12. Preferably, the composite block 10 contains the maximum fiber content to produce a composite having the greatest heat transferring capability per unit area. Typically, about 55% of the composite can be made of fibers while the other 45% is made of the matrix material.

To form a plate 20 as illustrated in FIG. 2, the composite block 10 is cut perpendicular to the direction of the fibers generally along the dotted line 22 illustrated in FIG. 1. The fibers in the resulting plate 20 preferably extend generally perpendicular to the plane of the plate 20 in the direction of the double-headed arrow 24. This orientation is further illustrated in FIG. 2A which shows a magnified view of several individual fibers 26. However, depending upon the application, the fibers may be skewed somewhat with respect to the arrow 24 in order to direct the heat along the longitudinal axes of the fibers rather along the direction of the arrow 24. Of course, the skewing means that fewer fibers extend from one side of the plate to the other side, so the heat transferring capability of the plate 20 decreases.

It should also be briefly noted that the preferred embodiments described with reference to FIGS. 1–10 are based on a rectangular block of composite material 10. However, the longitudinal thermal conductive properties of these types of fibers can be exploited in other ways. For instance, as illustrated in FIGS. 11–14, the fibers may be oriented generally in the same direction in other geometries, such as (1) a curved block, (2) a straight, curved, or bent rod or ribbon, (3) a braided cable, etc. Using the directional thermal conductivity of the fibers, heat may be transferred in any selected direction, or, as is of primary concern herein, heat transfer may be maximized by properly selecting the orientation of the fibers within the heat transfer element.

The plate 20 may be used as a heat transfer element at this stage of processing. For instance, the plate 20 (or a heat transfer element of another geometry) may be coupled to fluid carrying tubes. The heat from the fluid transfers to the tubes, and the heat from the tubes transfers to the plate 20 for dissipation.

Figure 5:
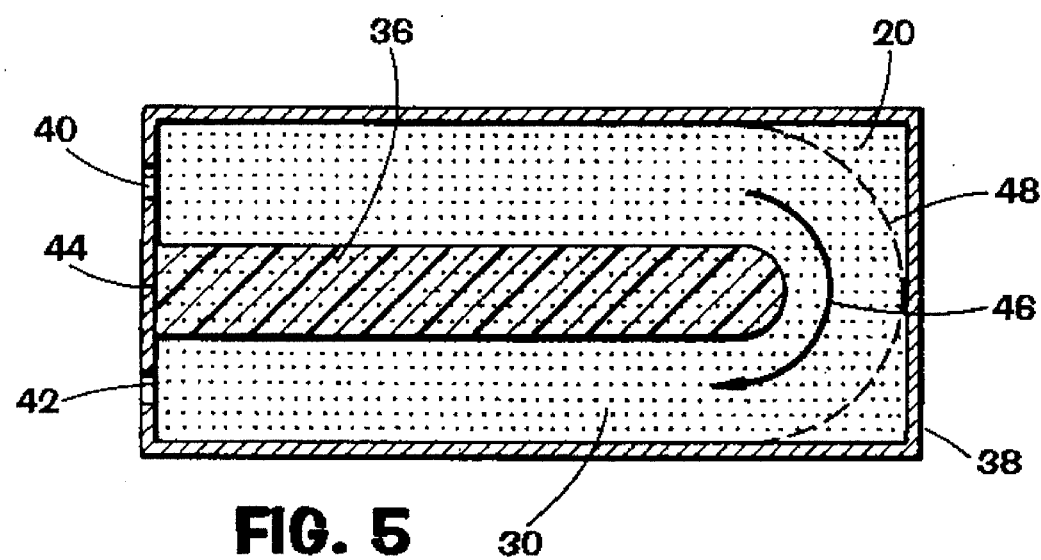
FIG. 5 illustrates a cross-sectional view taken along line 5—5 of the plate illustrated in FIG. 4.

Although the plate 20 may be used as a heat transfer element in certain applications without any further processing, the plate 20 is preferably processed further to form a heat transfer element that removes heat from fluid passing through it. As illustrated in FIGS. 3, 4, and 5, a slot 28 is preferably formed around the periphery of the plate 20, using a diamond-studded saw, for instance. This processing produces a substantially U-shaped slot 28 between what may now be defined as an upper portion 32 and a lower portion 34 of the plate 20. The upper portion 32 and the lower portion 34 of the plate 20 are integrally coupled together by the uncut central portion 36 of the plate 20. A plate of about ¼ to ⅜ inches thick may be used to fabricate a small yet efficient radiator in this manner.

Figure 6:
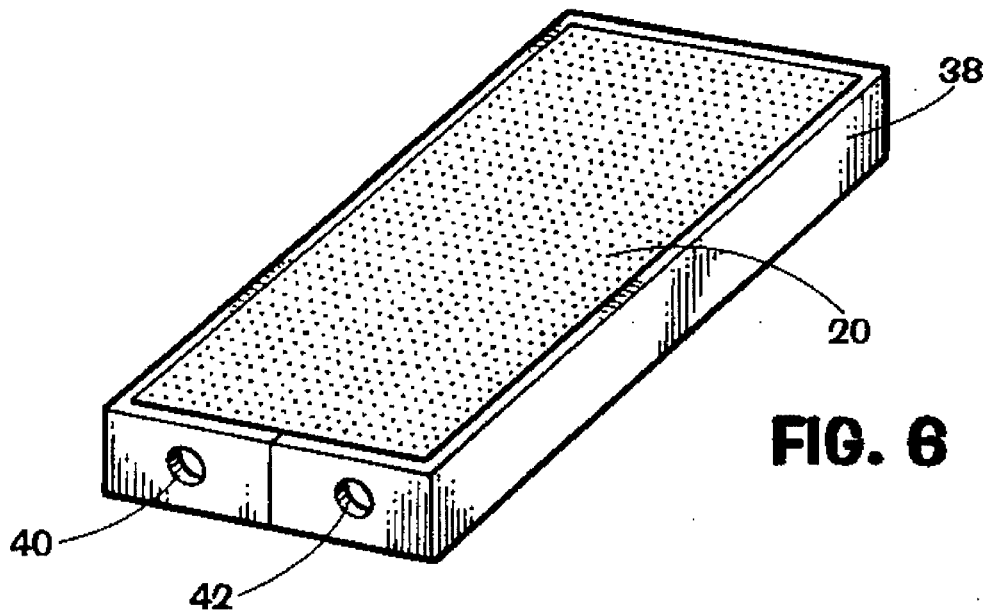
FIG. 6 illustrates a perspective view of the plate illustrated in FIG. 3 having the peripheral enclosed by a peripheral jacket.

After the slot 28 has been formed in the plate 20, the periphery of the plate 20 is closed to form a fluid channel 30, as illustrated in FIGS. 5 and 6. Although any suitable material may be used, such as metal, plastic, composite, etc., a metal flange 38 having about the same thickness as the plate 20 is coupled to the periphery of the plate 20. Preferably, adhesive couples the flange 38 to the periphery of the plate 20. For the preferred graphite composite plate and a copper flange, an adhesive denoted as LN30 available from the Ethyl Corporation, 451 Florida St., Baton Rouge, La. 70801 is effective. Of course, depending upon the materials and the application, those skilled in the art may find other adhesives or other securing means, such as clamps, to be effective.

The flange 38 preferably includes an entrance aperture 40 and an exit aperture 42 located near the closed end 44 of the channel 30. These apertures 40 and 42 may be tapped or otherwise formed so that they may be coupled to fluid carrying lines, for instance, so that fluid can flow into the heat transfer element through the entrance aperture 40 and flow out through the exit aperture 42. Thus, the fluid to be cooled flows through the heat transfer element generally in the direction of the curved arrow 46. To provide a smoother flow path, the corners of the plate 20 near the open end of the channel 30 may be rounded as indicated by the dashed line 48.

To form larger radiators, a plurality of heat transfer elements may be joined together. For instance, the elements may be joined side by side where each dement has its own entrance aperture and exit aperture. In other words, the fluid flowing through one dement would not enter or exit through another element. Alternatively, a plurality of plates 20 may be joined together in a matrix 50 as illustrated in FIG. 7. A flange 52 is placed around the periphery of the matrix 50. The matrix 50 forms a winding channel 54 that allows fluid to flow generally in the direction of the respective curved arrows 56, 58, and 60. The flange 52 contains an entrance aperture 62 and an exit aperture 64 through which fluid respectively enters and exits the matrix 50.

The individual plates 20 in the matrix 50 may be coupled to one another using an adhesive recognized by those skilled in the art as acceptable for bonding like materials together. Alternatively, the peripheries of the plates 20 may be further machined to provide a tongue and groove arrangement to facilitate coupling of the plates 20 to one another. Then, adhesive and/or mechanical means may be used to hold the matrix of plated together.

Although the currently preferred embodiment involves the formation of the upper and lower plates of the heat transfer element by forming a slot 28 in the periphery of a plate 20, separate plates 20 may be joined together by a separate divider to form a fluid carrying channel. As illustrated in FIG. 8, an upper plate 20A and a lower plate 20B can be joined together by a plurality of separate dividers 66A, 66B, and 66C so that the space between the dividers 66A, 66B, and 66C forms a winding fluid channel 68. The dividers 66 are preferably coupled to the plates 20A and 20B using adhesive, but other suitable means may also be used. Then, a flange (not shown) as illustrated in the previous embodiments may be coupled between the peripheries of the plates 20A and 20B to close the channel 68.

The divider 66A, illustrated in FIG. 9 by way of example, may also be made from the same fiber composite as the plates 20A and 20B. However, instead of the fibers in the divider 66A being parallel to the fibers in the plates 20A and 20B, it may be preferable to have the fibers in the divider 66A perpendicular to the fibers in the plates 20A and 20B. Thus, when fluid flows within the channel 68, the energy of the fluid will pass outwardly through the plates 20A and 20B generally in the direction of the double-headed arrow 70. Also, as the fluid flows further through the channel 68, it loses more energy. Thus, fluid on the entrance side of a divider 66A will typically contain more energy than fluid on the exit side of a divider 66A. With the fibers in each divider 66A, 66B, and 66C being perpendicular to the double-headed arrow 70 and being generally parallel to fluid flow in the direction of the arrow 72, the fluid on the entrance side of a divider 66A will transfer energy through the divider 66A to fluid on the exit side of the divider 66A. This will result in increased heat transfer for the heat transfer element.

In another embodiment, the plates 20A and 20B may be coupled together in spaced apart relation by a divider inserted about the periphery of the plates 20A and 20B rather than by the dividers 66 inserted between the interior regions of the plates 20A and 20B. For instance, the peripheral divider 74 as illustrated in FIG. 10 uses ledges 76 and 78 on which the peripheral edges of the plates 20A and 20B sit to keep the plates 20A and 20B spaced apart from one another. In this configuration, fluid may flow over substantially the entire surface of the plates 20A and 20B to maximize heat transfer from the fluid.

Figure 11:
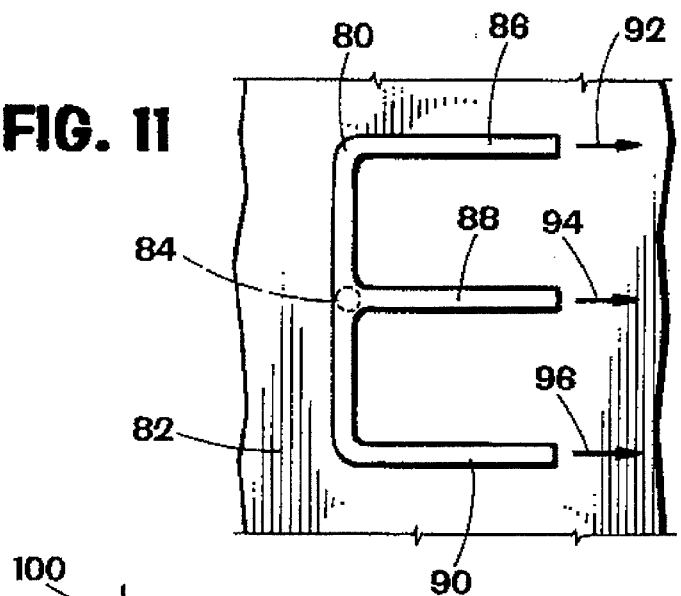
FIG. 11 illustrates a side view of a three-pronged directional radiator.
Figure 12:
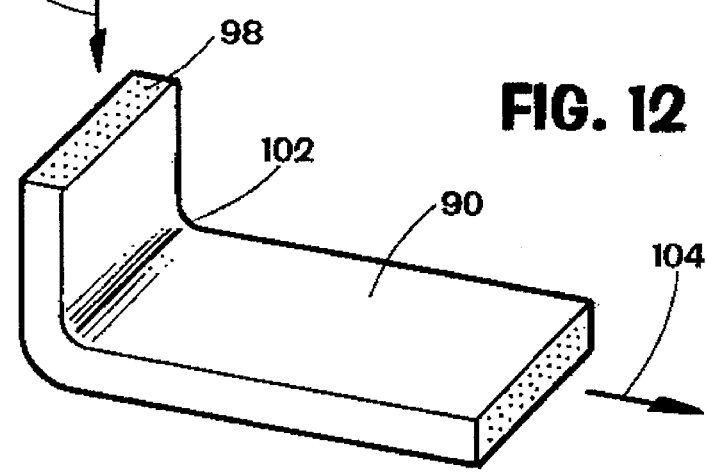
FIG. 12 illustrates a perspective view of one end prong of the three-pronged directional radiator illustrated in FIG. 11.

As mentioned previously, the longitudinal thermal conductive properties of these types of fibers may be exploited by more complicated directional radiators. As illustrated in FIGS. 11 and 12, a directional radiator 80 may be used to direct heat flow in a specific direction. In this specific embodiment, the directional radiator 80 is illustrated as residing on the outer shell 82 of an object or device. A heat source (not shown) resides within the device and is coupled to the directional radiator 80 by a post 84 that extends through the shell 82. Heat emanating from the heat source is channeled through the post 84 and through the three prongs 86, 88, and 90 of the directional radiator 80 so that the heat is dissipated along the direction of the arrows 92, 94, and 96.

A cut-away portion of the third prong 90 of the directional radiator 80 is illustrated in FIG. 12. As can be seen, the thermally conductive fibers initially extend in the direction of the arrow 100 and curve around the bend 102 to ultimately extend in the direction of the arrow 104. Thus, heat flows into the prong 90 in the direction of the arrow 100 and out of the prong 90 in the direction of the arrow 104. Of course, it is understood that similar bends occur at the junction of the post 84 with the second prong 88 and at the first prong 86.

A directional radiator, such as the directional radiator 80, may be used in a variety of applications where it is desirable to have heat directed in a particular fashion. For instance, a directional radiator may be coupled to an object that, for whatever reason, one would want to be undetectable by heat sensitive devices. One example might be a strategic orbiting satellite that directs its thermal energy into outer space radially away from the earth so that earthbound heat sensitive devices cannot detect the presence of the satellite. Of course, many other applications exist where it is desirable to direct the flow of thermal energy from one portion of a device to another. Indeed, in the previous example of an automobile engine, hoses carry the cooling fluid between the engine and the radiator and, thus, act as pathways for sending thermal energy from one place to another. However, unlike these hoses, the composite directional radiator discussed herein radiates only about 5 to 10% of the thermal energy radially, while 90 to 95% of the thermal energy flows along the direction of the fibers. Thus, the composite radiator provides a better pathway in many applications.

Figure 13:
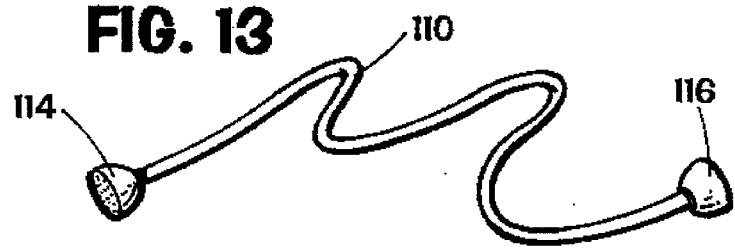
FIG. 13 illustrates a perspective view of a thermally directional cord.
Figure 14:
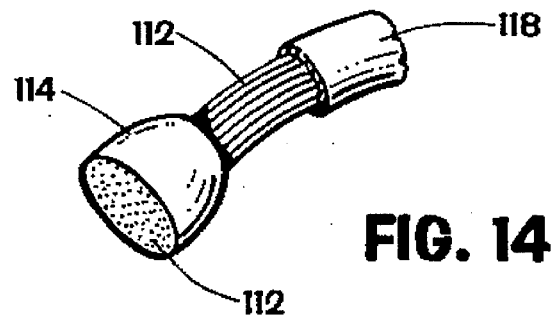
FIG. 14 illustrates a partially cut-away view of an end of the cord illustrated in FIG. 13.

The directional radiator 80 illustrated in FIGS. 11 and 12 is an example of a rigid directional radiator. However, some applications may be better served with a flexible directional radiator. As illustrated in FIGS. 13 and 14, a flexible directional radiator 110 may be formed as a cord of composite fiber bundles, using K1100X fibers, for instance. About 20,000 fibers would make up a cord of small diameter. Those skilled in the art will understand that the number of fibers, the particular type of composite used, and the method for forming the cord will vary depending upon the amount of thermal energy desired to be transferred along the cord 110 and the flexibility requirements of the cord 110.

As illustrated in FIG. 14, the fibers 112 extend generally longitudinally from a plug 114 at one end of the cord 110 to a plug 116 at the other end of the cord 110. Preferably, the ends of the bundles of fibers 112 are molded into composites which form hard plugs 114 and 116. The ends of the fibers 112 may be exposed by the process which forms the plugs 114 and 116 or they may be exposed by machining the ends of the plugs 114 and 116 after the plugs are formed. Typically, one of the plugs would be connected to a heat source; the other plug would be routed to emit the thermal energy in a particular direction, or it could be connected to another device, such as a radiator or heating element.

Although the thermal conductive characteristics of the fibers 112 in the axial direction are quite good, radial radiation may be minimized by providing an insulating shell 118 over the bundles of fibers 112. For instance, an insulating cloth could be wrapped or braided over the bundles of fibers 112, or an insulative plastic or composite coating may be applied or extruded over the bundles of fibers 112. This layer of insulation may also extend over the plugs 114 and 116 to provide a further reduction in unwanted thermal radiation if desired.

What is claimed is:

1. A heat transfer element comprising:
    a plate having a first side and a second side and being comprised of fibers extending longitudinally from said first side to said second side, said fibers having a greater longitudinal thermal conductivity than radial thermal conductivity, said plate having a channel extending through said plate in a direction generally perpendicular to said fibers.

2. The heat transfer element, as set forth in claim 1, wherein said first side and said second side of said plate are generally flat and parallel to one another.

3. The heat transfer element, as set forth in claim 1, wherein said channel is comprised of a slot formed in the periphery of said plate between said first side and said second side and extending in a direction generally perpendicular to said fibers.

4. The heat transfer element, as set forth in claim 1, wherein said plate is comprised of fiber composite material.

5. The heat transfer element, as set forth in claim 4, wherein said fiber composite material is selected from a group consisting of an organic matrix composite, a carbon/carbon composite, a metal matrix composite, and a ceramic matrix composite.

6. The heat transfer element, as set forth in claim 5, wherein said organic matrix composite is comprised of graphite fibers in an epoxy resin matrix.

7. The heat transfer element, as set forth in claim 5, wherein said carbon/carbon composite is comprised of graphite fibers cured from an organic matrix composite having graphite fibers in an organic resin matrix.

8. The heat transfer element, as set forth in claim 5, wherein said metal matrix composite is selected from a group consisting of graphite fibers in an aluminum matrix and graphite fibers in a copper matrix.

9. The heat transfer element, as set forth in claim 1, wherein said fibers are comprised of graphite fibers.

10. The heat transfer element, as set forth in claim 9, wherein said graphite fibers are comprised of K1100X graphite fibers.

11. The heat transfer element, as set forth in claim 3, further comprising:
a flange coupled to the periphery of said plate, said flange covering said slot to form said channel within said plate, said flange having a fluid entering aperture and a fluid exiting aperture.

12. The heat transfer element, as set forth in claim 11, wherein said flange is coupled to the periphery of said plate by adhesive.

13. The heat transfer element, as set forth in claim 11, wherein said flange is comprised of metal.

14. A heat transfer element comprising:
a first plate having a first side and a second side, said first plate being comprised of first fibers extending longitudinally from said first side of said first plate to said second side of said first plate, said first fibers having a greater longitudinal thermal conductivity than radial thermal conductivity;
a second plate having a first side and a second side, said second plate being comprised of second fibers extending longitudinally from said first side of said second plate to said second side of said second plate, said second fibers having a greater longitudinal thermal conductivity than radial thermal conductivity; and
a divider coupling said first side of said first plate to said second side of said second plate to form a channel extending between said first side of said first plate and said second side of said second plate in a direction generally perpendicular to said first fibers and said second fibers.

15. The heat transfer element, as set forth in claim 14, wherein said first side and said second side of said first plate are generally flat and parallel to one another and wherein said first side and said second side of said second plate are generally flat and parallel to one another.

16. The heat transfer element, as set forth in claim 14, wherein said channel is comprised of a peripheral slot extending between said first side of said first plate and said second side of said second plate in a direction generally perpendicular to said first fibers and said second fibers.

17. The heat transfer element, as set forth in claim 14, wherein said first plate and said second plate are comprised of fiber composite material.

18. The heat transfer element, as set forth in claim 17, wherein said fiber composite material is selected from a group consisting of an organic matrix composite, a carbon/carbon composite, a metal matrix composite, and a ceramic matrix composite.

19. The heat transfer element, as set forth in claim 18, wherein said organic matrix composite is comprised of graphite fibers in an epoxy resin matrix.

20. The heat transfer element, as set forth in claim 18, wherein said carbon/carbon composite is comprised of graphite fibers cured from an organic matrix composite having graphite fibers in an organic resin matrix.

21. The heat transfer element, as set forth in claim 18, wherein said metal matrix composite is selected from a group consisting of graphite fibers in an aluminum matrix and graphite fibers in a copper matrix.

22. The heat transfer element, as set forth in claim 14, wherein said first fibers and said second fibers are comprised of graphite fibers.

23. The heat transfer element, as set forth in claim 22, wherein said graphite fibers are comprised of K1100X graphite fibers.

24. The heat transfer dement, as set forth in claim 16, further comprising:
a flange coupling the periphery of said first plate to the periphery of said second plate, said flange covering said peripheral slot to form said channel between said first side of said first plate and said second side of said second plate, said flange having a fluid entering aperture and a fluid exiting aperture.

25. The heat transfer element, as set forth in claim 24, wherein said flange is coupled to the periphery of said first plate and to the periphery of said second plate by adhesive.

26. The heat transfer element, as set forth in claim 24, wherein said flange is comprised of metal.

* * * * *

UNITED STATES PATENT AND TRADEMARK OFFICE
CERTIFICATE OF CORRECTION

PATENT NO. : 5,542,471
DATED : August 6, 1996
INVENTOR(S) : Richard G. Dickinson It is certified that error appears in the above-indentified patent and that said Letters Patent is hereby corrected as shown below:

On the title page, and in col. 1, line 1:

In the Title delete "THE" between "HAVING" and "THERMALLY"

Column 10, line 37 (claim 24, line 1) delete "dement" and insert -- element --.

Signed and Sealed this

Twenty-eighth Day of January, 1997

Attest:

BRUCE LEHMAN

*Attesting Officer*   *Commissioner of Patents and Trademarks*